(12) United States Patent
Kruglick (10) Patent No.: US 8,948,016 B2
(45) Date of Patent: Feb. 3, 2015

(54) COMMUNICATION NETWORK MONITORING

(75) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 342 days.

(21) Appl. No.: 12/999,835

(22) PCT Filed: Aug. 6, 2010

(86) PCT No.: PCT/US2010/044626
§ 371 (c)(1),
(2), (4) Date: Dec. 17, 2010

(87) PCT Pub. No.: WO2012/018343
PCT Pub. Date: Feb. 9, 2012

(65) Prior Publication Data
US 2012/0033556 A1    Feb. 9, 2012

(51) Int. Cl.
*H04L 12/26*    (2006.01)
*H04L 12/24*    (2006.01)

(52) U.S. Cl.
CPC .......... *H04L 43/026* (2013.01); *H04L 41/0631* (2013.01)
USPC .......... 370/241; 370/229; 370/233; 370/236; 370/253

(58) Field of Classification Search
USPC ................. 370/229, 233–236, 241, 252–253, 370/395.52; 709/223–229
See application file for complete search history.

(56) References Cited

U.S. PATENT DOCUMENTS

| 6,112,236 | A  | * | 8/2000  | Dollin et al. ................ 709/224 |
| 6,167,445 | A  |   | 12/2000 | Gai et al. |
| 6,694,471 | B1 | * | 2/2004  | Sharp ............................ 714/749 |
| 7,185,073 | B1 |   | 2/2007  | Gai et al. |

(Continued)

FOREIGN PATENT DOCUMENTS

| JP | 2004215217 A | 7/2004 | |
| WO | WO0163825 A2 * | 8/2001 | ............... H04L 1/00 |

OTHER PUBLICATIONS

Claudio Cicconetti et al., "Quality of Service Support in IEEE 802.16 Networks," IEEE Network, Mar./Apr. 2006, pp. 50-55.
Ian Foster et al., "End-to-End Quality of Service for High-End Applications," Computer Communications 27, No. 14, 2004.
Shaojian Fu et al., "SCTP: State of the Art in Research, Products, and Technical Challenges," IEEE Communications Magazine, Apr. 2004, pp. 64-76.

(Continued)

*Primary Examiner* — Un C Cho
*Assistant Examiner* — Peter Mak
(74) *Attorney, Agent, or Firm* — Ren-Sheng International (57) ABSTRACT

Techniques described herein generally include methods, devices and systems related to monitoring a flow of data packets in a communication network. Some example devices may include one or more of a stream capture unit, and/or an analyzer. The stream capture unit can be coupled to a communication network, and configured to monitor a flow of data packets associated with communication steams in the communication network, and identify a first stream of data packets and a second stream of data packets from the monitored flow of data packets. The first stream and the second stream are associated with a single destination. The analyzer can be coupled to the stream capture unit and configured to identify an event associated with from the first stream identified by the stream capture unit, identify information related to the identified event from the second stream identified by the stream capture unit, and determine a response based on the event and the information related to the event.

20 Claims, 7 Drawing Sheets

(56) References Cited

U.S. PATENT DOCUMENTS

| | | | |
|---|---|---|---|
| 2002/0174218 A1 | 11/2002 | Dick et al. | |
| 2005/0022089 A1 | 1/2005 | Le et al. | |
| 2008/0189225 A1* | 8/2008 | Herring et al. | 705/400 |
| 2008/0307528 A1* | 12/2008 | Chen et al. | 726/26 |
| 2008/0313347 A1* | 12/2008 | Kasturi et al. | 709/237 |
| 2009/0129267 A1* | 5/2009 | McNair et al. | 370/231 |
| 2011/0026568 A1* | 2/2011 | Hadizad et al. | 375/220 |

OTHER PUBLICATIONS http://tools.ietf.org/html/rfc4960.
http://en.wikipedia.org/wiki/Session_Initiation_Protocol.
http://en.wikipedia.org/wiki/SCTP.
PCT—Written Opinion of the International Searching Authority, Nov. 1, 2010.

* cited by examiner

600 A computer program product

604 A signal bearing medium 602 at least one of one or more instructions for monitoring a flow of data packets associated with communication streams in a communication network;

identifying a first stream of data packets and a second stream of data packets from the monitored flow of data packets, wherein the first stream and the second stream are associated with a single destination in the communication network;

identifying an abnormal event associated with the first stream;

identifying information related to the identified abnormal event from the second stream; and/or determining a response based on the abnormal event and the information related to the abnormal event.

606 a communication medium 608 a non-transitory computer readable medium 610 a recordable medium

COMMUNICATION NETWORK MONITORING

CROSS-REFERENCE TO RELATED APPLICATIONS

The present application is a 371 application of International Application PCT/US2010/044626, filed on Aug. 6, 2010 and entitled "COMMUNICATION NETWORK MONITORING."

TECHNICAL FIELD

The present disclosure related generally to networking technologies and more specifically to techniques for monitoring a flow of data packets in a communication network.

BACKGROUND

Unless otherwise indicated herein, the approaches described in this section are not prior art to the claims in this application and are not admitted to be prior art by inclusion in this section.

Communication network usage is increasing. Accordingly, the amount of data traffic is also increasing. For example, there is an increase in the transmission of multimedia contents, which can include a plurality of streaming contents such as video, location-dependent language audio, dynamic advertising, or video overlays for banner advertising or pop-ups.

With the increase in network usage and data traffic, performance measurement tools have been created to measure the service of the vendor as well as a customer's experience with a vendor. For instance, Quality of Service (QoS) is traditionally a resource reservation control mechanism, which is an objective measurement approach of the service vendor. QoS focuses on measuring technical data such as jitter, packet losses, and data rates. Moreover, QoS may also focus on measuring qualitative consumer research like laboratory experiments and surveys. Quality of Experience (QoE) is another performance measurement tool that subjectively measures a customer's experience with a vendor.

The present disclosure identifies and appreciates that existing performance measurement tools fail to provide a network service provider with sufficient information to differentiate among the various causes for performance related issues on a communication network. As a result, the network service provider is unable to effectively respond to the detected performance issues. The present disclosure describes techniques to monitor a communication network.

SUMMARY

Some embodiments of the present disclosure may generally relate to monitoring devices configured to monitor a flow of data packets associated with communication streams in a communication network. One example monitoring device may include a stream capture unit coupled to the communication network, and the stream capture unit may be configured to monitor the flow of data packets associated with the communication streams in the communication network and identify a first stream of data packets and a second stream of data packets from the monitored flow of data packets, wherein the first stream and the second stream are associated with a single destination in the communication network. The example monitoring device may also include an analyzer coupled to the stream capture unit. The analyzer may be configured to identify an event associated with the first stream identified by the stream capture unit, identify information related to the identified event from the second stream identified by the stream capture unit, and determine a response based on the event and the information related to the event.

Some additional embodiments of the present disclosure may generally relate to methods for monitoring a flow of data packets associated with communication streams in a communication network. One example method may include monitoring the flow of data packets associated with the communication streams. The example method may also include identifying a first stream of data packets and a second stream of data packets from the monitored flow of data packets, wherein the first stream and the second stream are associated with a single destination in the communication network, identifying an event associated with the first stream, and identifying information related to the identified event from the second stream. Based on the event and the information related to the event, the example method may include determining a response.

Additional embodiments of the present disclosure may generally relate to computer-readable media containing instructions for monitoring a flow of data packets associated with communication streams in a communication network. One example computer-readable medium may contain instructions, which when executed by a monitoring device, causes the monitoring device to monitor the flow of data packets associated with the communication streams, identifying a first stream of data packets and a second stream of data packets from the monitored flow of data packets, wherein the first stream and the second stream are associated with a single destination in the communication network, identify an event associated with the first stream, identify information related to the identified event from the second stream, and determine a response based on the event and the information related to the event.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer programs related to the monitoring of control data associated with multiple streams of data packets and determining appropriate responses for addressing quality of experience issues, as will be described herein.

Briefly stated, techniques described herein generally include methods, devices and systems related to monitoring a flow of data packets in a communication network. Some example devices may include one or more of a stream capture unit, and/or an analyzer. The stream capture unit can be coupled to a communication network, and configured to monitor a flow of data packets associated with communication steams in the communication network, and identify a first stream of data packets and a second stream of data packets from the monitored flow of data packets. The first stream and the second stream are associated with a single destination. The analyzer can be coupled to the stream capture unit and configured to identify an event associated with the first stream identified by the stream capture unit, identify information related to the identified event from the second stream identified by the stream capture unit, and determine a response based on the event and the information related to the event.

Figure 1:
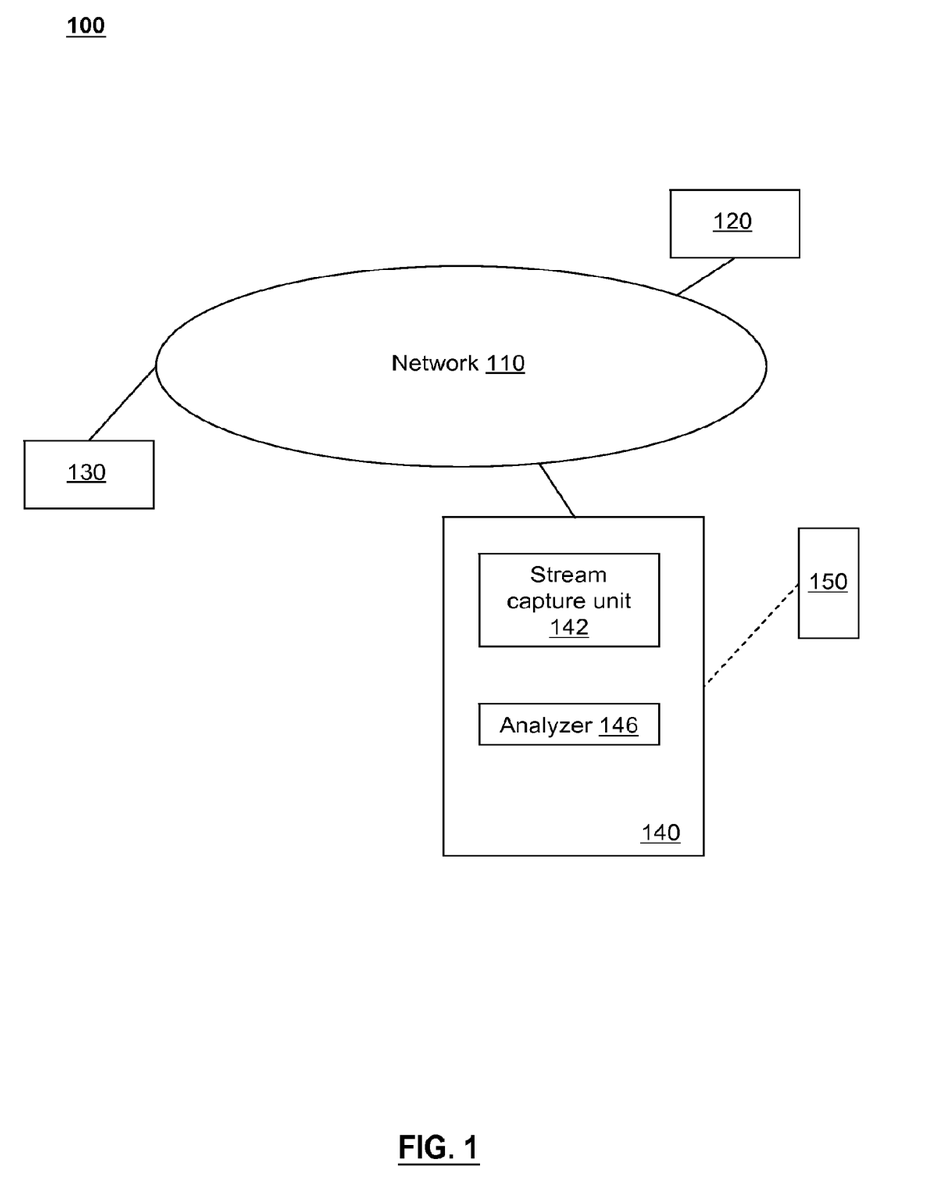
FIG. 1 illustrates an example communication network system.

FIG. 1 illustrates an example communication network system 100, arranged in accordance with at least some embodiments of the present disclosure. The example communication network system 100 may include a network 110, a first computing device 120, a second computing device 130, and/or a third computing device 140. Additionally, the communication network system 100 may include a client device 150.

The network 110 may be an open loop network or a closed loop network and configured with communication streams for the flow of data or information. FIG. 1 shows the first computing device 120, the second computing device 130, and the third computing device 140, each being coupled to the network 110. The first computing device 120, the second computing device 130, and the third computing device 140 may be coupled to the network 110 at various points of the network 110 via a physical medium such as one or more wires or cables. Furthermore, the communication network system 100 may include the client device 150, which may be coupled to the third computing device 140 via a wireless communication channel. In some non-limiting examples, the client device 150 may be a computing device located at an end-user or consumer. An example computing device may include, but is not limited to, a desktop computer, a laptop computer, a notebook computer, a personal digital assistant (PDA), a mobile phone, a tablet computing device, a netbook, and/or some other similar device.

The network 110 of the present disclosure may be any communication network configured for the flow and exchange of electronic information, data and/or signals. Network 110 may be any variety of networks, including but not limited to, a local area network (LAN), a wide area network (WAN), the World Wide Web (WWW), and/or any appropriate combination thereof. In some examples, network 110 may be comprised of one or more wired communication links. In some other examples, network 110 may be comprised of one or more wireless communication links. In still further examples, network 110 may be comprised of a combination of wired communication links and wireless communication links.

The first computing device 120 may be a network server supporting a first type of service (e.g., multimedia services), and the second computing device 130 may be another network server supporting a second type of service (e.g., telecommunication services). For example, the first computing device 120 may be a YouTube® server, and the second computing device 130 may be a Skype® server.

In accordance with the various techniques described in the present disclosure, the third computing device 140 may be configured to not only provide services for the client device 150 but also monitor data packets traveling between the client device 150 and the network 110. The third computing device 140 may be located at a service provider site and may also be referred to as a monitoring device.

According to some embodiments of the present disclosure, the third computing device 140 may include a stream capture unit 142 and an analyzer 146. The stream capture unit 142 may be configured to identify multiple streams of data packets, and the analyzer 146, coupled to the stream capture unit 142, may be configured to determine an appropriate response based on the control data associated with the identified multiple streams. Subsequent paragraphs will further detail the retrieval and also the analysis of the control data.

Figure 2:
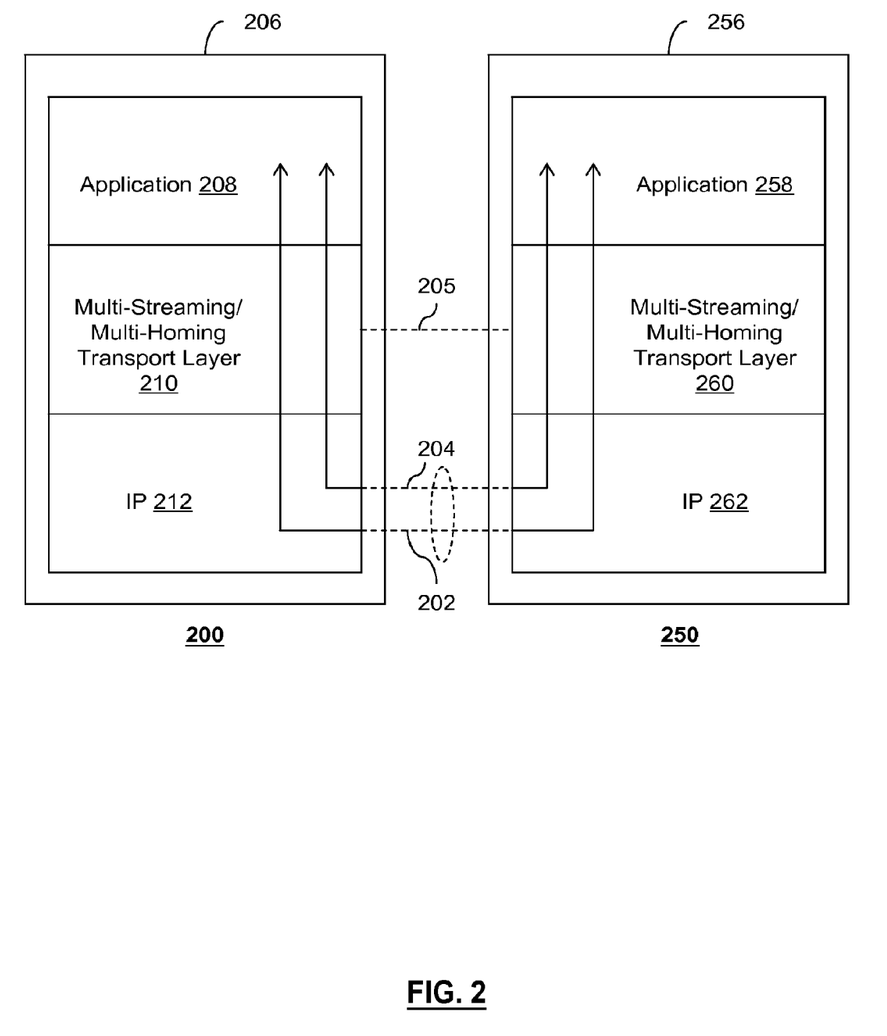
FIG. 2 is a schematic diagram of simplified Internet protocol stacks.

FIG. 2 is a schematic diagram of simplified Internet protocol stacks, arranged in accordance with at least some embodiments of the present disclosure. FIG. 2 further illustrates multistreaming and multihoming features that are supported by computing devices and client devices on a network, such as the computing devices 120, 130, and 140 and the client device 150 shown in FIG. 1. A first end point 200 may be coupled to a second end point 250 via one or more network interfaces. The first end point 200 may be configured to support a first Internet protocol stack 206 having an application layer 208, a multistreaming/multihoming transport layer 210, and an IP layer 212. The second end point 250 may be configured to support a second Internet protocol stack 256 having an application layer 258, a multistreaming/multihoming transport layer 260, and an IP layer 262.

Some of the main features of the multistreaming/multihoming transport layers 210 and 260 include multistreaming and multihoming. Multistreaming allows data from independent streams, such as a first data stream 202 and a second data stream 204, and from the upper layer application to be multiplexed onto one channel, also referred to as an association. In other words, the first data stream 202 and the second data stream 204 are multiplexed onto an association 205. With the association, the synchronization between the multiple data streams may improve, and the resources/overhead to process the multiple data streams may be shared.

For illustration, suppose the client device 150 of FIG. 1 corresponds to the first end point 200 of FIG. 2, and the first computing device 120 of FIG. 1 may corresponds to the second end point 250 of FIG. 2. Suppose further that the client device 150 executes a web browser application, which requests for a HyperText Markup Language (HTML) page containing a Java applet object and an image object from the first computing device 120. Instead of creating a separate connection for each object as in Transmission Control Protocol (TCP), the multistreaming feature supported by the multistreaming/multihoming transport layers 210 allows the transfer of the two objects (i.e., the Java applet object and the image object) in the first data stream 202 and the second data stream 204 independently. Thus, if one object is lost during the transfer, the other object could still be delivered to the web browser application executing on the client device 150 while the lost object is being retransmitted from the first computing device 120.

Multihoming allows a coupling between the first end point 200 and the second end point 250 that span across multiple IP addresses. For example, the first end point 200 may be coupled to the second end point 250 via a satellite link, which is associated with a first IP address, and the first end point 200 may also be coupled to an asynchronous transfer mode (ATM) link, which is associated with a second IP address. One of the IP addresses may be designated as the primary address, and the other IP address may be designated as the backup address in case of failure of the primary address, or when the upper-layer application explicitly requests use of the backup address. Thus, with the multihoming feature, recovery from link failure situations without interrupting ongoing data transfer may be sped up.

One example multistreaming/multihoming transport layer may be Stream Control Transmission Protocol (SCTP), which has been proposed to overcome various limitations of (TCP). As the client device 150 and the computing device 120 exchange multiple streams of data packets, a service provider operating the third computing device 140 can monitor the control data associated with such data packets traveling to and from the client device 150 to ascertain the quality of experience at the client device 150. In accordance with some embodiments of the present disclosure, the operations of monitoring control data and also determining the quality of experience require neither altering applications executing on the client device 150 nor altering formats of the communications between the client device 150 and the first computing device 120.

Some of the aforementioned control data may be retrieved from known network control messages. For example, when a packet is dropped in a network, network control messages indicative of such a dropped packet event are generally communicated among the nodes in the network in an attempt to recover the dropped packet. Generally, these network control messages are generated by intermediate nodes, not the two end points.

Figure 3:
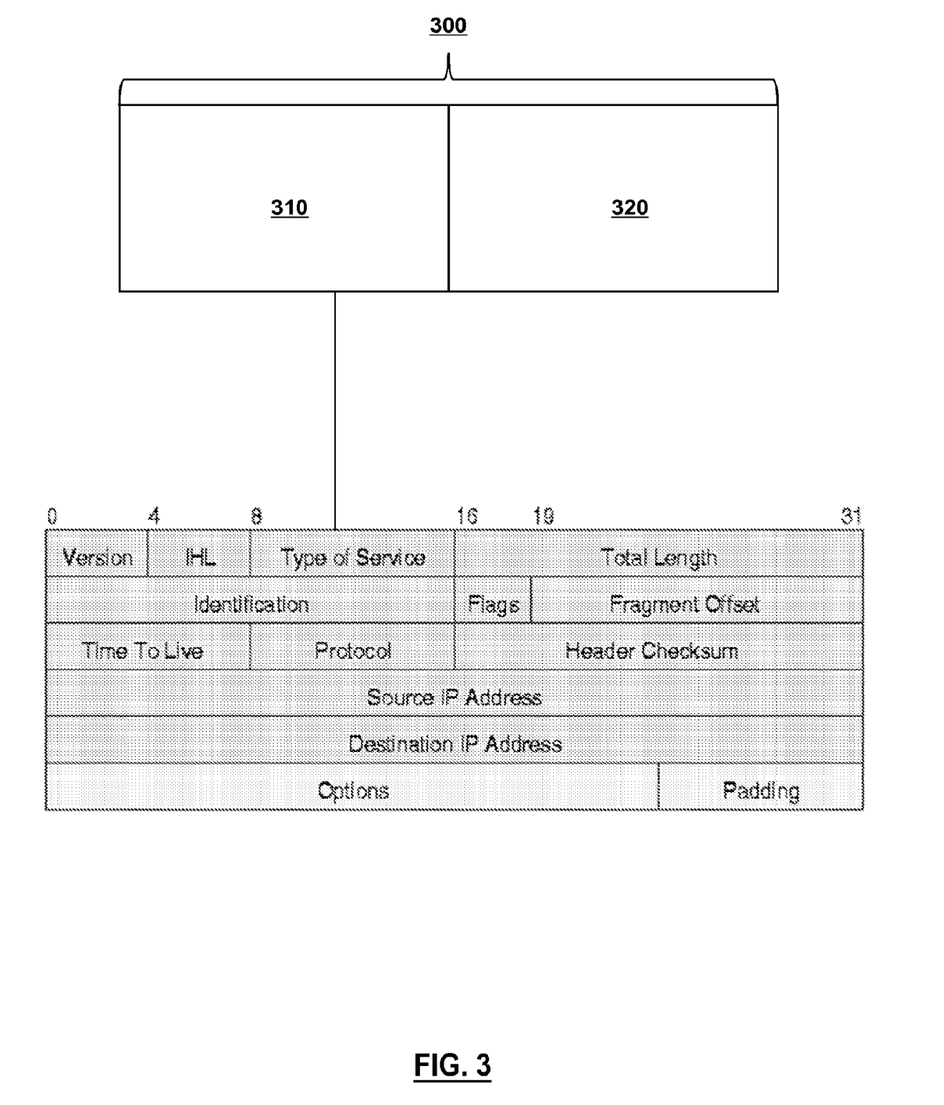
FIG. 3 is a block diagram illustrating an example IP packet.

Some control data may be retrieved from SCTP packets. FIG. 3 is a block diagram illustrating an example IP packet 300. The IP packet 300 may include an IP header 310, and IP contents 320, which may include a SCTP packet. The IP header 310 may include a Version field, an Internet Header Length (IHL) field, a Type of Service field, a Total Length field, an Identification field, a Flags field, a Fragment Offset field, a Time to Live field, a Protocol field, a Header Checksum field, a Source IP Address field, a Destination IP Address field, an Options field, and a Padding field. In some embodiments, by examining the Protocol field, the Identification field, the Source IP Address field, and/or the Destination IP Address field, the stream capture unit 142 of FIG. 1 may be able to identify a stream of data packets adhering to SCTP and having a session identifier. In addition, the stream capture unit 142 may obtain certain information associated with the stream of data packets and send such information to the analyzer 146. For example, the stream capture 142 may review the Time to Live field and pass the collected elapsed transport time to the analyzer 146. Some additional examples of information that the stream capture unit 142 may obtain include, without limitation, chunk flags, checksum error related information, and others.

Figure 4:
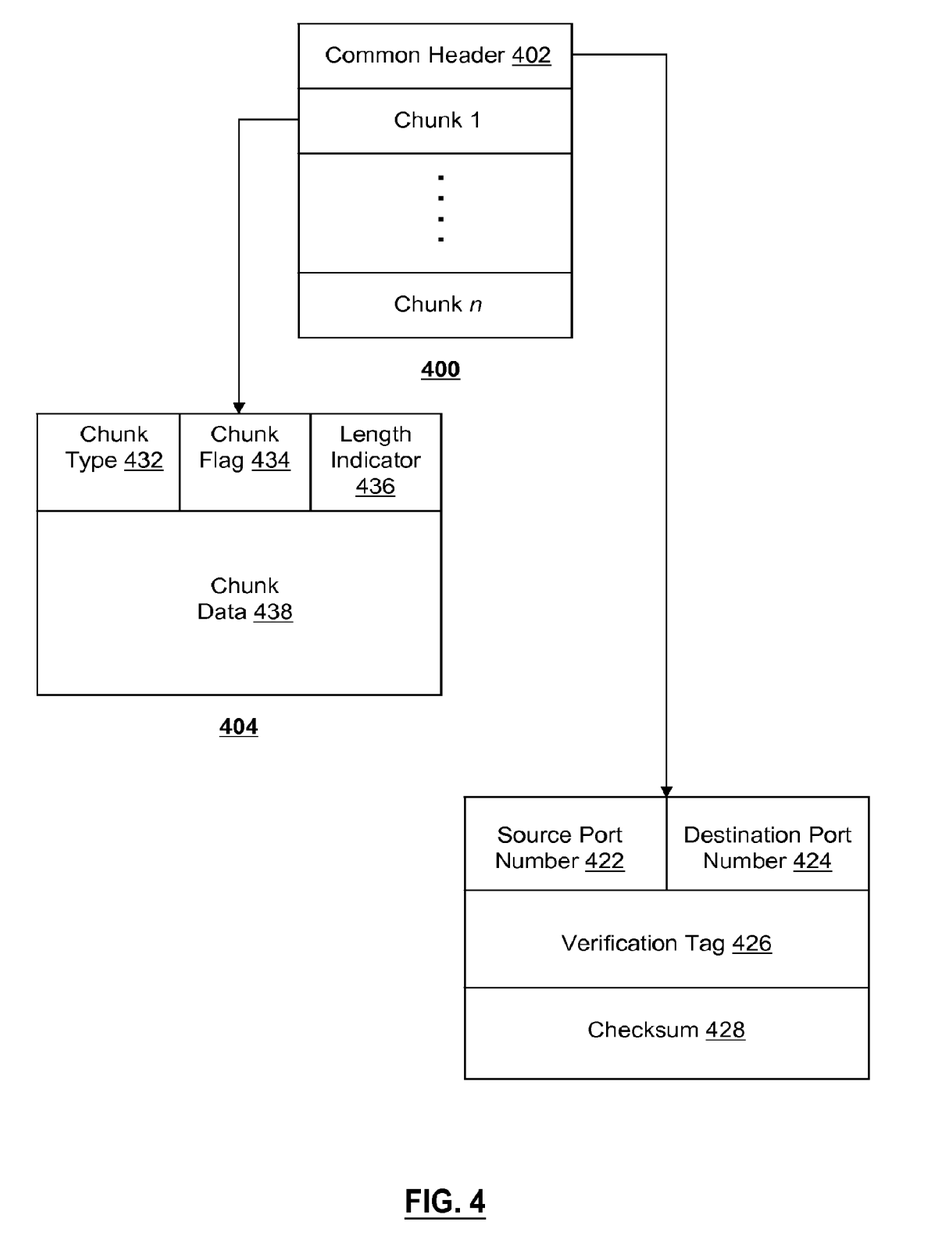
FIG. 4 is a block diagram illustrating an example SCTP packet.

FIG. 4 is a block diagram illustrating an example SCTP packet 400, arranged in accordance with at least some embodiments of the present disclosure. The SCTP packet 400 delivered to the lower layers may include a common header 402 followed by one or more chunks 404. The common header 402 may include one or more fields for a source port number 422, a destination port number 424, a verification tag field 426, and/or a checksum field 428. Each of the chunks 404 may include fields for a chunk type 432, a chunk flag 434, a length indicator 436, and chunk data 438. By examining the values of the fields in the chunk 404, a monitoring device, such as the third computing device 140 of FIG. 1, can extract certain control data. For example, when the chunk type 432 is 0, the third computing device 140 may determine that the chunk data 438 is payload data and thus does not include any control data. When the chunk type 432 is a non-zero value, such as 4, the third computing device 140 may retrieve the control data that the chunk 404 is a heart beat request. When the chunk type 432 is 5, the third computing device 140 may retrieve the control data that the chunk 404 is a heart beat acknowledgement. Since exchanging the heart beat request and the heart beat acknowledgment between a SCTP packet sender and a SCTP packet receiver may help to ensure the proper functioning of such two end points, the third computing device 140 may be configured to analyze the retrieve control data and determine an appropriate response. How such response may be determined is further detailed in subsequent paragraphs.

Figure 5:
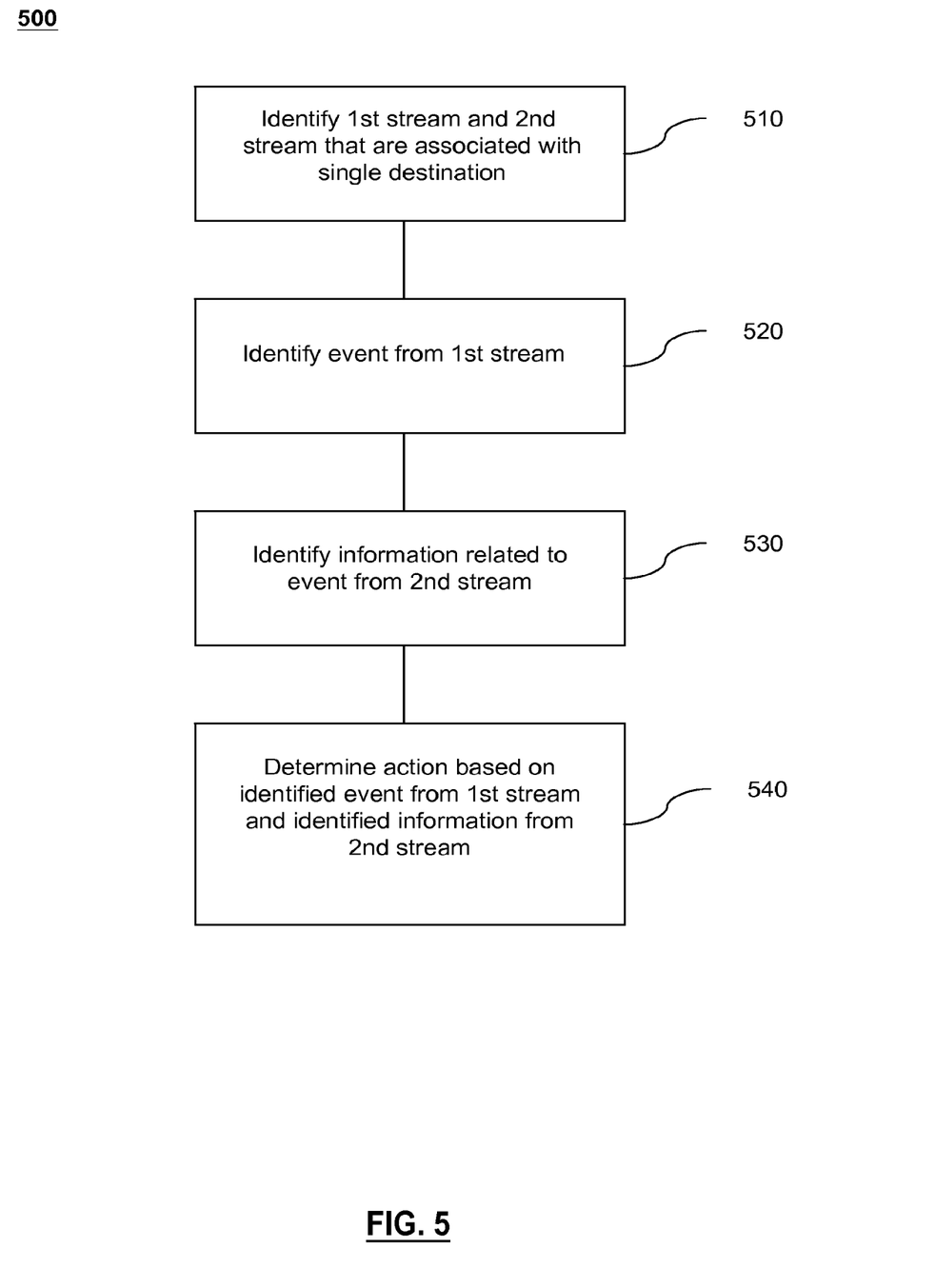
FIG. 5 is an example flow chart illustrating a method for monitoring control data.

FIG. 5 is an example flow chart illustrating a method 500 for monitoring control data, arranged in accordance with at least some embodiments of the present disclosure. Method 500 may include one or more operations, functions or actions as illustrated by one or more of blocks 510, 520, 530, and/or 540. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Processing for method 500 may begin at block 510, "Identify 1st stream and 2nd stream that are associated with single destination." Block 510 may be followed by block 520, "Identify event from 1st stream." Block 520 may be followed by block 530, "Identify information related to event from 2nd stream." Block 530 may be followed by block 540, "Determine action based on identified event from 1st stream and identified information from 2nd stream."

In conjunction with FIG. 1, in block 510, the stream capture unit 142 of the third computing device 140 may be configured to identify multiple streams of data packets that are associated with the same destination, such as the aforementioned browser application being executed on the client device 150. In some implementations, as mentioned above, the stream capture unit 142 may be configured to look for the associative information between the first stream and the second stream by examining the Identification field, the Protocol field, the Source IP Address field, and/or the Destination IP Address field in the IP packets 300 shown in FIG. 3. After having identified the first stream and the second stream of data packets, the stream capture unit 142 may be configured to relay the identified streams or information summarized from the streams to the analyzer 146 for further processing.

In block 520, the analyzer 146 may be configured to look for an event from the first stream of data packets. An example event may be any event that impacts the quality of service and/or quality of experience, such as a dropped packet event, which the analyzer 146, as discussed above, could evaluate the network control messages that are retrieved from the network 110 and also are associated with the first stream of data packets. Another example event may be a blocked data event, which the analyzer 146 could also evaluate the network control messages that are retrieved from the network 110 and are associated with the first stream of data packets. Yet another example event may correspond to poor quality of data delivery, which the analyzer 146 could evaluate the control data embedded in the SCTP packets (e.g., a significantly higher number of heart beat requests than heart beat acknowledgements). Another example event may correspond to congestion detection, which the analyzer 146 could evaluate the flags 12-13 in the chunk flag field 434 of the SCTP packet 400 illustrated in FIG. 4. Other example events may correspond to gap detection and error detection, which the analyzer 146 could also evaluate the control data embedded in the SCTP packets.

In block 530, the analyzer 146 may be further configured to evaluate the second stream of data packets to identify information related to the event. In one example, based on whether there is also a dropped packet event for the second stream, the analyzer 146 could be configured to distinguish between a single dropped packet event and a network service disruption event, especially since the first stream and the second stream are associated. When multiple associated streams experience dropped packets, there may be a strong inference that network services have been disrupted.

In another example, based on whether there are requests for the blocked data from an end point, such as the client device 150, from the second stream, the analyzer 146 could be configured to determine whether the blocked data event has affected the quality of experience at the end point. In other words, when no request for the blocked data is identified, there may be a strong inference that the end point has a significantly large buffer enabling the end point to wait for the blocked data without negatively impacting its quality of experience. On the other hand, when there are requests for the blocked data, there may be a strong inference that the end point lacks the buffer space and its quality of experience has already deteriorated.

In block 540, based on the analysis performed in block 530, the analyzer 146 may be configured to determine an appropriate response. For example, an appropriate response for a dropped packet event may be for the analyzer 146 to do nothing and just allow the intermediate nodes in the network 110 to continue to request the dropped packet. In response to the disrupted network service event, on the other hand, the analyzer 146 may be configured to inform the end points, such as the client device 150 and the first computing device 120, to restore the network connection. In another example, a response for having insufficient buffer space at a receiving end point (e.g., the client device 150) the analyzer 146 may be configured to inform a sending end point (e.g., the first computing device 120) to speed up the delivery of the blocked data or reprioritize its delivery tasks. The response for having sufficient buffer space at the receiving end point, on the other hand, may be for the analyzer 146 to do nothing and just allow the sending end point to continue its operations as usual.

Figure 6:
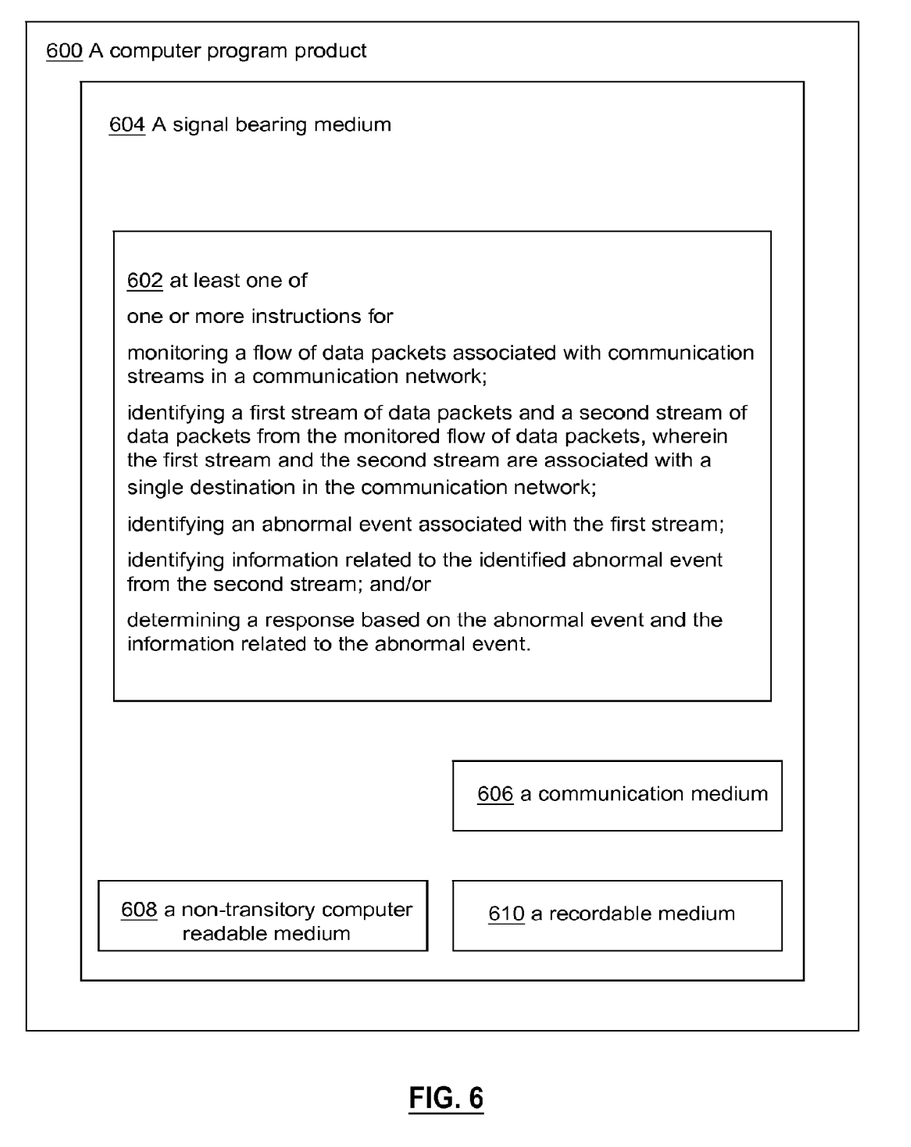
FIG. 6 is a block diagram of an illustrative embodiment of a computer program product for implementing a method for monitoring control data.

FIG. 6 is a block diagram of an illustrative embodiment of a computer program product 600 for implementing a method for monitoring control data associated with multiple streams of data packets and determining a response, arranged in accordance with at least some embodiments of the present disclosure. Computer program product 600 may include a signal bearing medium 604. Signal bearing medium 604 may include one or more sets of executable instructions 602 that, when executed by, for example, a processor of a computing device (e.g., the computing device 140 of FIG. 1), may provide at least the functionality described above with respect to FIG. 5.

In some implementations, signal bearing medium 604 may encompass a non-transitory computer readable medium 608, such as, but not limited to, a hard disk drive, a Compact Disc (CD), a Digital Video Disk (DVD), a digital tape, memory, etc. In some implementations, signal bearing medium 604 may encompass a recordable medium 610, such as, but not limited to, memory, read/write (R/W) CDs, R/W DVDs, etc. In some implementations, signal bearing medium 604 may encompass a communications medium 606, such as, but not limited to, a digital and/or an analog communication medium (e.g., a fiber optic cable, a waveguide, a wired communications link, a wireless communication link, etc.). Computer program product 600 may be recorded on non-transitory computer readable medium 608 or another similar recordable medium 610.

Figure 7:
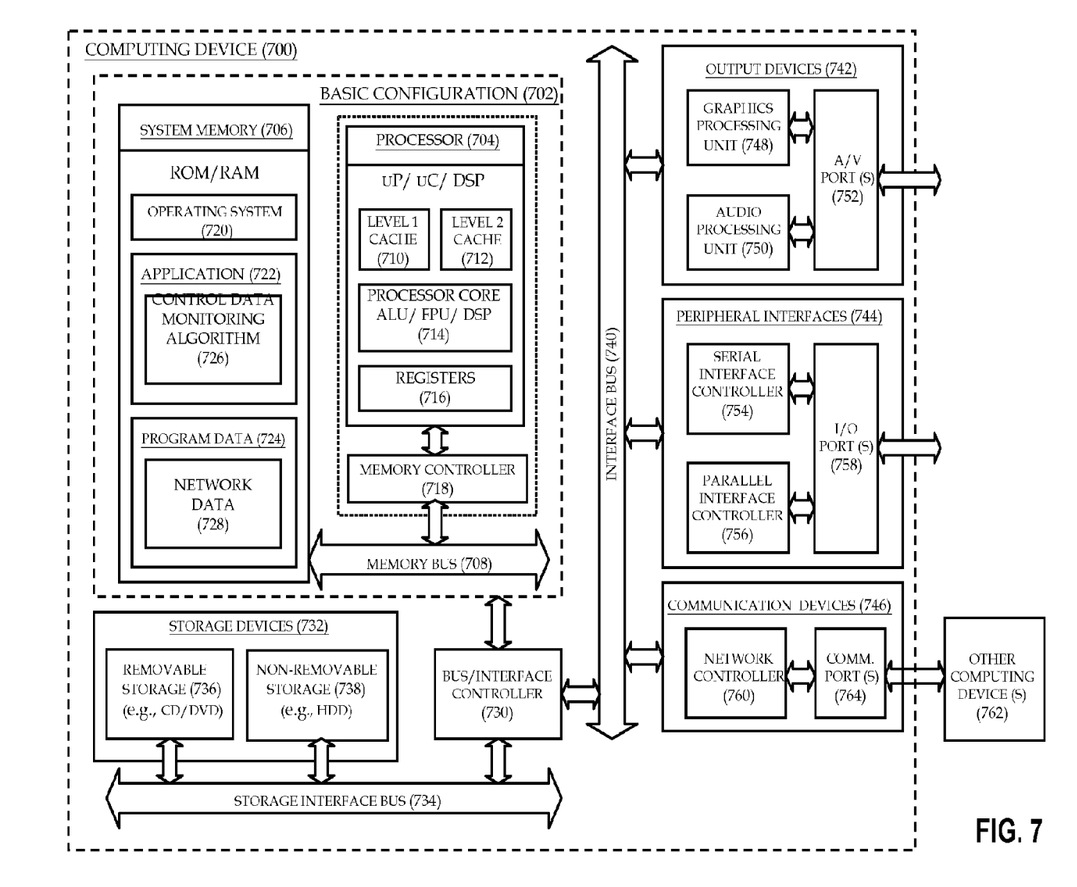
FIG. 7 is a block diagram illustrating an example computing device that is arranged for monitoring control data; all arranged in accordance with at least some embodiments of the present disclosure.

FIG. 7 is a block diagram illustrating an example computing device 700 that is arranged for monitoring control data, according to at least some embodiments of the present disclosure. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (μP), a microcontroller (μC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a control data monitoring algorithm 726 that is arranged to perform the functions as those described with respect to method 500 of FIG. 5. Program data 724 may include network data 728 that may be useful for operation with control data monitoring algorithm 726 as is described herein. In some embodiments, application 722 may be arranged to operate with program data 724 on operating system 720. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link, such as, without limitation, optical fiber, Long Term Evolution (LTE), 3G, WiMax, via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A monitoring device configured to monitor a flow of data packets associated with communication streams in a communication network between a first end point and a second end point, the monitoring device comprising:
   a stream capture unit coupled to the communication network and the second end point, wherein the stream capture unit is configured to
      monitor the flow of data packets associated with the communication streams in the communication network from a same point on the communication network, and
      identify a first stream of data packets and a second stream of data packets from the monitored flow of data packets, wherein the first stream and the second stream are multiplexed onto an association between the first end point and the second end point; and
   an analyzer, coupled to the stream capture unit, wherein the analyzer is configured to:
      identify an event associated with the first stream identified by the stream capture unit,
      identify information related to the event from the second stream identified by the stream capture unit,
      determine a cause for quality of service related issues associated with the communication network or quality of experience related issues at the second end point based on the event and the information related to the event, and
      determine a response based on the determined cause.

2. The monitoring device of claim 1, wherein the analyzer is further configured to extract control data from a transport layer packet; and
identify the event and the information related to the event based on the extracted control data.

3. The monitoring device of claim 1, wherein the analyzer is further configured to
extract control data from a network control message; and
identify the event and the information related to the event based on the extracted control data.

4. The monitoring device of claim 3, wherein the event corresponds to a first dropped packet event for the first stream, and the information related to the event identifies that there is a second dropped packet event for the second stream.

5. The monitoring device of claim 3, wherein the event corresponds to a blocked data event for the first stream, and the information related to the event identifies that there is a request for blocked data for the second stream.

6. The monitoring device of claim 2, wherein the event corresponds to having more heart beat requests than heart beat acknowledgements.

7. The monitoring device of claim 2, wherein the transport layer packet is a Stream Control Transmission Protocol (SCTP) packet.

8. A method to monitor a flow of data packets associated with communication streams in a communication network between a first end point and a second end point, comprising:
monitoring the flow of data packets associated with the communication streams from a same point on the communication network;
identifying a first stream of data packets and a second stream of data packets from the monitored flow of data packets, wherein the first stream and the second stream are multiplexed onto an association between the first end point and the second end point;
identifying an event associated with the first stream;
identifying information related to the event from the second stream;
determining a cause for quality of service related issues associated with the communication network or quality of experience related issues at the second end point based on the event and the information related to the event; and
determining a response based on the determined cause.

9. The method of claim 8, further comprising:
extracting a control data from a transport layer packet; and
identifying the event and the information related to the event based on the extracted control data.

10. The method of claim 8, further comprising:
extracting a control data from a network control message; and
identifying the event and the information related to the event based on the extracted control data.

11. The method of claim 10, wherein the event corresponds to a first dropped packet event for the first stream, and the information related to the event identifies that there is a second dropped packet event for the second stream.

12. The method of claim 10, wherein the event corresponds to a blocked data event for the first stream, and the information related to the event corresponds to whether there is a request for blocked data for the second stream.

13. The method of claim 9, wherein the event corresponds to having more heart beat requests than heart beat acknowledgements.

14. The method of claim 9, wherein the transport layer packet is a Stream Control Transmission Protocol (SCTP) packet.

15. A non-transitory computer-readable medium containing instructions for monitoring a flow of data packets associated with communication streams in a communication network between a first end point and a second end point, which in response to execution by a monitoring device, causes the monitoring device to:
monitor the flow of data packets associated with the communication streams from a same point on the communication network;
identify a first stream of data packets and a second stream of data packets from the monitored flow of data packets in the communication network, wherein the first stream and the second stream multiplied onto an association between the first end point and the second end point;
identify an event associated with the first stream;
identify information related to the event from the second stream;
determine a cause for quality of service related issues associated with the communication network or quality of experience related issues at the second end point based on the event and the information related to the event; and
determine a response based on the determined cause.

16. The computer-readable medium of claim 15, further containing additional instructions, which when executed by the monitoring device, causes the monitoring device to:
extract a control data from a transport layer packet; and
identify the event and the information related to the event based on the extracted control data.

17. The computer-readable medium of claim 15, further containing additional instructions, which when executed by the monitoring device, causes the monitoring device to:
extract a control data from a network control message; and
identify the event and the information related to the event based on the extracted control data.

18. The computer-readable medium of claim 17, wherein the event corresponds to a first dropped packet event for the first stream, and the information related to the event identifies that there is a second dropped packet event for the second stream.

19. The computer-readable medium of claim 17, wherein the event corresponds to a blocked data event for the first stream, and the information related to the event corresponds to whether there is a request for blocked data for the second stream.

20. The computer-readable medium of claim 16, wherein the event corresponds to having more heart beat requests than heart beat acknowledgements.

* * * * *